(12) United States Patent
Sizemore et al.

(10) Patent No.: US 9,973,423 B2
(45) Date of Patent: May 15, 2018

(54) AUTOMATED PATH-FINDING AND INTEGRATED BANDWIDTH MANAGEMENT FOR HYBRID VIDEO ROUTING CONNECTIONS

(71) Applicant: Ross Video Limited, Iroquois (CA)

(72) Inventors: Donald Mark Sizemore, Virginia Beach, VA (US); Andrew M. Zimmer, Virginia Beach, VA (US)

(73) Assignee: Ross Video Limited, Iroquois (CA)

( * ) Notice: Subject to any disclaimer, the term of this patent is extended or adjusted under 35 U.S.C. 154(b) by 188 days.

(21) Appl. No.: 15/093,806

(22) Filed: Apr. 8, 2016

(65) Prior Publication Data

US 2016/0301605 A1 Oct. 13, 2016

Related U.S. Application Data

(60) Provisional application No. 62/145,618, filed on Apr. 10, 2015.

(51) Int. Cl.
| | |
|---|---|
| *H04L 12/729* | (2013.01) |
| *H04L 12/26* | (2006.01) |
| *G06F 3/0484* | (2013.01) |
| *G06F 3/048* | (2013.01) |
| *H04L 12/721* | (2013.01) |

(52) U.S. Cl.
CPC .......... *H04L 45/70* (2013.01); *H04L 43/0882* (2013.01)

(58) Field of Classification Search
CPC ......... H04L 65/60; H04L 67/36; H04L 45/70; H04L 43/0882; H04L 41/22
See application file for complete search history.

(56) References Cited

U.S. PATENT DOCUMENTS

| | | | | |
|---|---|---|---|---|
| 6,496,856 B1* | 12/2002 | Kenner | ............. | G06F 17/30017 |
| | | | | 348/E5.008 |
| 2010/0115561 A1* | 5/2010 | Ribordy | ................. | H04H 20/51 |
| | | | | 725/71 |
| 2016/0057733 A1* | 2/2016 | Grandillo | ............. | H04H 20/423 |
| | | | | 370/252 |
| 2016/0080274 A1* | 3/2016 | Meyer | ..................... | H04L 47/18 |
| | | | | 370/231 |
| 2016/0105523 A1* | 4/2016 | Dowdell | ............... | H04L 45/306 |
| | | | | 709/230 |
| 2016/0205043 A1* | 7/2016 | Beers | ..................... | H04L 49/254 |
| | | | | 370/419 |
| 2016/0218971 A1* | 7/2016 | Basunov | ................. | H04L 45/70 |

\* cited by examiner

*Primary Examiner* — Ahmed Elallam
(74) *Attorney, Agent, or Firm* — Wolf, Greenfield & Sacks, P.C.

(57) ABSTRACT

Automated path-finding and integrated bandwidth management for hybrid video routing connections are disclosed. When a video source signal is to be routed to a video router from a remote video router, a control system automatically determines whether the video source signal is routable to the video router from the remote video router over a hybrid connection that includes connection segments of different types. The video source signal is routed to the video router from the remote video router through the hybrid connection if the video source signal is routable to the video router from the remote video router over a hybrid connection. In an embodiment, a single user interface allows a user to request routing of video source signals.

24 Claims, 10 Drawing Sheets

AUTOMATED PATH-FINDING AND INTEGRATED BANDWIDTH MANAGEMENT FOR HYBRID VIDEO ROUTING CONNECTIONS

CROSS-REFERENCE TO RELATED APPLICATION

The present application is related to, and claims the benefit of, U.S. Provisional Patent Application No. 62/145,618, filed on Apr. 10, 2015, the entire contents of which are incorporated herein by reference.

FIELD

The present disclosure relates generally to video routing and, in particular, to managing hybrid video routing connections.

BACKGROUND

Serial Digital Interface (SDI) connections and SDI routers are often used in routing video signals. For relatively short connections less than a few hundred metres, SDI routers can be interconnected with coaxial cables and connectors, and routing can be controlled using a single control system and control interface. Such direct interconnections are generally referred to as SDI tie-lines.

Hybrid connections including connection segments of different types may be used for longer-range connections. For example, an SDI router could connect to another SDI router through an Ethernet network and Internet Protocol (IP) based connection. In this case, each SDI router could connect to the Ethernet network through an Ethernet ingress or egress component such as an encoder or a decoder, and the connection between the SDI routers is a hybrid connection including SDI connections between each router and its ingress or egress component and an IP/Ethernet network connection. According to conventional routing control and management techniques, a user would need to manually manage and coordinate the connection settings and routes for such a hybrid connection using multiple different control systems, including one for the SDI router control space to make the correct switches at each SDI router, another one for the network ingress and egress component configurations, and yet another one for managing and monitoring IP/Ethernet connectivity.

SUMMARY

According to an aspect of the present disclosure, a method includes: receiving a request for routing a video source signal to a video router from a remote video router; responsive to the request, automatically determining whether the video source signal is routable to the video router from the remote video router over a hybrid connection between the video router and the remote video router; and routing the video source signal to the video router from the remote video router through the hybrid connection where it is determined that the video source signal is routable to the video router from the remote video router over a hybrid connection. The hybrid connection includes connection segments of different types.

In an embodiment, the determining involves determining whether capacity available on the hybrid connection is sufficient to carry the video source signal by monitoring parameters on one or more of the connection segments and determining a link budget based on the parameters.

In an embodiment, the one or more of the connection segments includes an Ethernet connection, and the monitoring involves monitoring parameters at an Ethernet switch through Simple Network Management Protocol (SNMP).

In an embodiment, the determining involves: determining whether capacity available on the hybrid connection is sufficient to carry the video source signal based on a hard coded link budget for one or more of the connection segments.

In an embodiment, the determining involves determining whether communication network resources are available to switch a route for the hybrid connection, and the method includes: returning a response to the request indicating that the request cannot be executed, where communication network resources are not available to switch a route for the hybrid connection.

In an embodiment, the determining involves determining whether capacity available on the hybrid connection is sufficient to carry the video source signal, and the method includes: returning a response to the request indicating that the request cannot be executed, where the capacity available on the hybrid connection is not sufficient to carry the video source signal.

In an embodiment, the video router and the remote video router include respective Serial Digital Interface (SDI) video routers and the hybrid connection includes an Ethernet connection.

In an embodiment, the Ethernet connection includes an Ethernet connection between an encoder and a decoder through an Ethernet switch, and the routing involves determining settings for the Ethernet encoder and the Ethernet decoder and configuring the Ethernet encoder and the Ethernet decoder with the determined settings.

In an embodiment, the method also includes: monitoring one or more of the connection segments; and dynamically adjusting the settings of the Ethernet encoder and the Ethernet decoder based on the monitoring.

In an embodiment, the hybrid connection is one of multiple hybrid connections between the video router and the remote video router, and the method includes: determining available bandwidth on one or more of the connection segments; and determining a distribution of the available bandwidth between the hybrid connections.

In an embodiment, determining a distribution of the available bandwidth involves determining an equal distribution of the available bandwidth between the hybrid connections.

In an embodiment, determining a distribution of the available bandwidth involves allocating a minimum bandwidth to one of the multiple hybrid connections and determining a distribution of a remainder of the available bandwidth between other hybrid connections of the multiple hybrid connections.

The method may also involve presenting a Graphical User Interface (GUI) on a display. The includes: representations of video outputs of the video router; representations of video sources of the remote video router, including the video source signal; and a control graphical element to enable a user to generate the request for routing the video source signal to the video router from the remote video router, by selecting the representation of the video source signal and the representation of one of the video outputs of the video router.

The representations of the video outputs, the representations of the video sources, and the control graphical element may be parts of a first screen of the GUI, and the method may also involve presenting a second screen of the GUI on the display. The second screen could include representations of the video router and the remote video router; representations of hybrid connections between the video router and the remote video router; and one or more of: representations of configuration settings for each of the hybrid connections; a representation of total available bandwidth for hybrid connections between the video router and the remote video router; and a representation of bandwidth utilization of the total available bandwidth by the hybrid connections between the video router and the remote video router.

According to another aspect, a non-transitory computer-readable medium stores instructions which, when executed by a processor, cause the processor to perform a method as described herein.

A further aspect relates to an apparatus that includes: a display; an interface to enable communication with video routers; and a controller, operatively coupled to the display and to the interface, to present on the display a single user interface to enable a user to make a request for routing a video source signal to a video router from a remote video router; to automatically determine responsive to the request whether the video source signal is routable to the video router from the remote video router over a hybrid connection that includes connection segments of different types between the video router and the remote video router, and to route the video source signal to the video router from the remote video router through the hybrid connection where it is determined that the video source signal is routable to the video router from the remote video router over a hybrid connection.

In an embodiment, the apparatus also includes: an interface, operatively coupled to the controller, to enable the controller to monitor parameters on one or more of the connection segments, and the controller is configured to determine a link budget for the hybrid connection based on the parameters.

In an embodiment, the controller is configured to determine whether the video source signal is routable to the video router from the remote video router over a hybrid connection by determining whether communication network resources are available to switch a route for the hybrid connection and if so, whether capacity available on the hybrid connection is sufficient to carry the video source signal, and the controller is further configured to provide, in the user interface, a response to the request indicating that the request cannot be executed, where communication network resources are not available to switch a route for the hybrid connection or the capacity available on the hybrid connection is not sufficient to carry the video source signal.

As noted above, the video router and the remote video router include respective SDI video routers and the hybrid connection includes an Ethernet connection in an embodiment.

In an embodiment, the Ethernet connection includes an Ethernet connection between an encoder and a decoder through an Ethernet switch, and the controller is configured to route the video source signal to the video router from the remote video router through the hybrid connection by determining settings for the Ethernet encoder and the Ethernet decoder and configuring the Ethernet encoder and the Ethernet decoder with the determined settings.

In an embodiment, the hybrid connection is one of multiple hybrid connections between the video router and the remote video router, and the controller is further configured to determine available bandwidth on one or more of the connection segments, and to determine a distribution of the available bandwidth between the hybrid connections.

In an embodiment, the distribution is either: an equal distribution of the available bandwidth between the multiple hybrid connections; or a minimum bandwidth allocation to one of the multiple hybrid connections and a distribution of a remainder of the available bandwidth between other hybrid connections of the multiple hybrid connections.

In an embodiment, the single user interface includes a Graphical User Interface (GUI). The GUI could include: representations of video outputs of the video router; representations of video sources, including the video source signal, of the remote video router; and a control graphical element to enable the user to make the request for routing of the video source signal to the video router from the remote video router, by selecting the representation of the one or more video sources and the one or more outputs.

In an embodiment, the representations of the video outputs, the representations of the video sources, and the control graphical element comprise a first screen of the GUI, and the GUI also includes a second screen. The second screen includes: representations of the video router and the remote video router; representations of hybrid connections between the video router and the remote video router; and one or more of: representations of configuration settings for each of the hybrid connections; a representation of total available bandwidth for hybrid connections between the video router and the remote video router; a representation of bandwidth utilization of the total available bandwidth by the hybrid connections between the video router and the remote video router.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
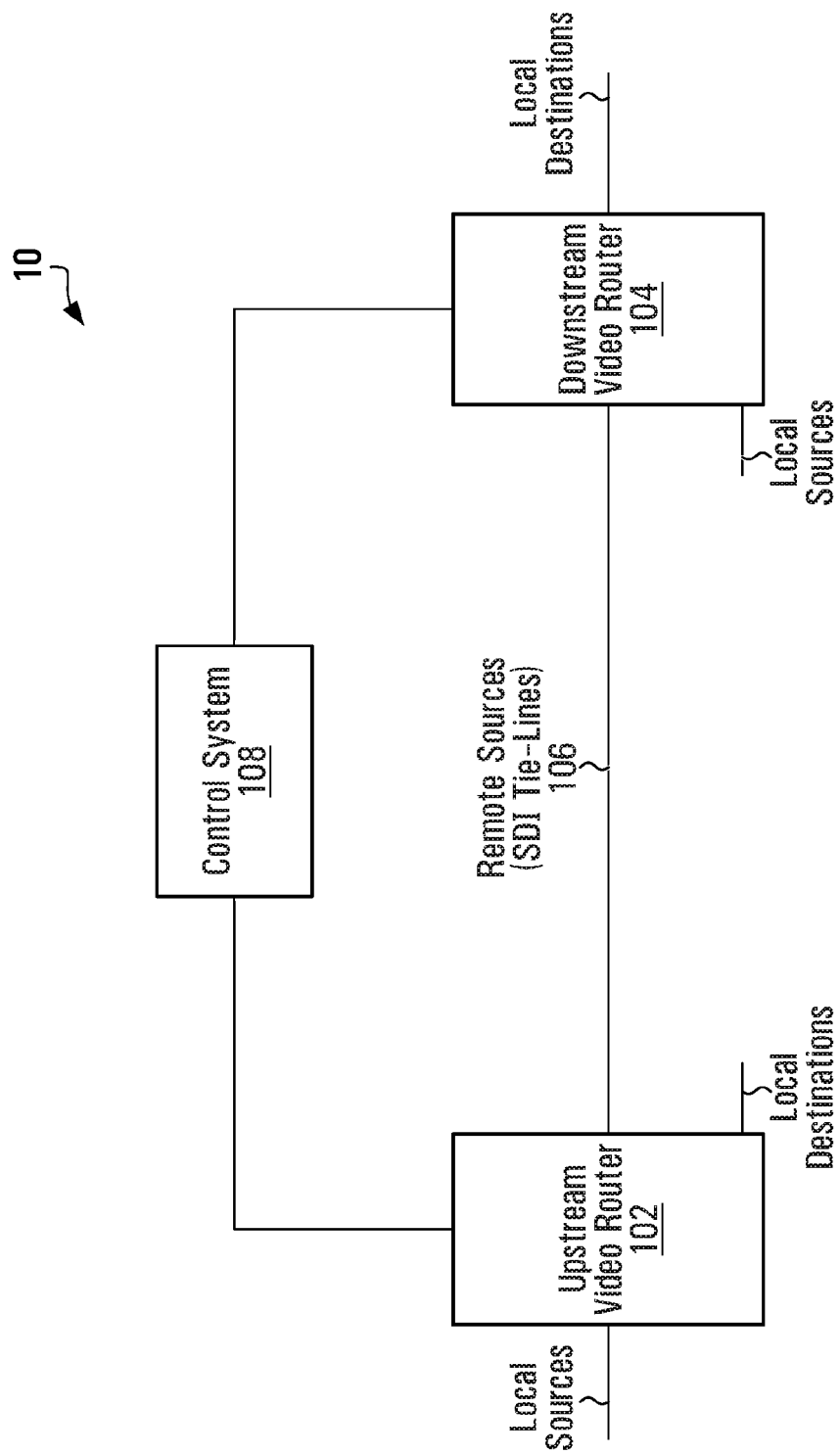
FIG. 1 is a block diagram of an example video routing system with SDI tie-lines.

Embodiments of the present disclosure relate to automated path-finding and integrated bandwidth management for hybrid connections, such as connections in SDI and Ethernet video monitoring solutions.

As noted above, management of hybrid connections with conventional tools requires a user to manually coordinate settings and routes using multiple different control systems. This tends to be slow, inefficient, and very cumbersome, and especially prohibitive for classic broadcast operators who usually are sheltered from the actual physical configuration details.

According to an embodiment disclosed herein, an integrated control system handles path or route optimization for hybrid video routing connections and provides a unified operational interface. This may enable management of hybrid connections such as those that include IP/Ethernet virtual tie-lines across a classic SDI video routing system, automatic management of channel setup and possibly also adjustment of compression/scaling to fit into available Ethernet bandwidth, for example. Uncompressed, non-scaled solutions are also contemplated, but would not involve adjustments, and would be limited by Ethernet network and bandwidth availability.

Consider an example in which a user wants to monitor a source from a remote, upstream system through an SDI/Ethernet hybrid connection. With an integrated solution according to an embodiment, tie-line/resource management intelligence in an integrated control system: 1) determines whether there are enough resources and bandwidth available to make the connection by looking at the system inventory and reading switch utilization, 2) automatically controls the upstream SDI video router to switch the source to an available Ethernet ingress device such as an encoder, 3) adjusts any other variable set stream encoding to optimize overall performance on each link, such as by dividing available bandwidth by the number of actively monitored streams (some streams could be set with a minimum encoding setting to maintain a minimum level of quality and not be adjusted, but would be used in the calculation), and finally 4) switches the downstream SDI video router input, associated with an available Ethernet egress device such as a decoder, to the appropriate destination per the original request. In this manner, an integrated solution may ease operations from the user perspective, based on automating a complex set of video routing control activities across disparate systems. From a broadcast engineering perspective, an integrated controller for hybrid connections may provide easier bandwidth optimization and monitoring relative to conventional implementations that involve multiple control systems for hybrid connections.

There are several potential advantages of an integrated control system. Such a system could automatically find a route across a hybrid interconnected system including both baseband SDI and IP/Ethernet connections, for example. From a user perspective, this could reduce the video routing operation from a complex series of coordinated, managed and ordered events to a single action. Secondly, an integrated solution could optimize an available IP/Ethernet link by maximizing utilization and signal performance based on the number of active tie-lines required for downstream destination requests. Distilling the operational experience down to something that fits within the classic SDI control surface may enable an advanced, hybrid workflow in which different link types can be utilized. This could be especially important for applications such as video monitoring, in which a high level of quality is not necessary and a compressed, more cost effective IP/Ethernet solution could be more efficient and appropriate.

FIG. 1 is a block diagram of an example video routing system with SDI tie-lines. In the example video routing system 100, two SDI video routers 102, 104 are connected by SDI tie-lines 106. Connection control and video routing are handled in this example by the control system 108. Each of the SDI video routers 102, 104 in this example has local source inputs and outputs to local destinations. FIG. 1 represents a classic or legacy example system in which one or more SDI tie-lines 106 interconnect the video routers 102, 104 to switch between multiple frames for remote upstream source requests, such as requests to monitor remote sources from the upstream router 102 at the downstream router 104. Although the SDI tie-lines 106 have full signal bandwidth, they are limited by SDI link capacity and SDI maximum cable length, and are less efficient, especially when only monitoring quality is required for video.

Figure 2:
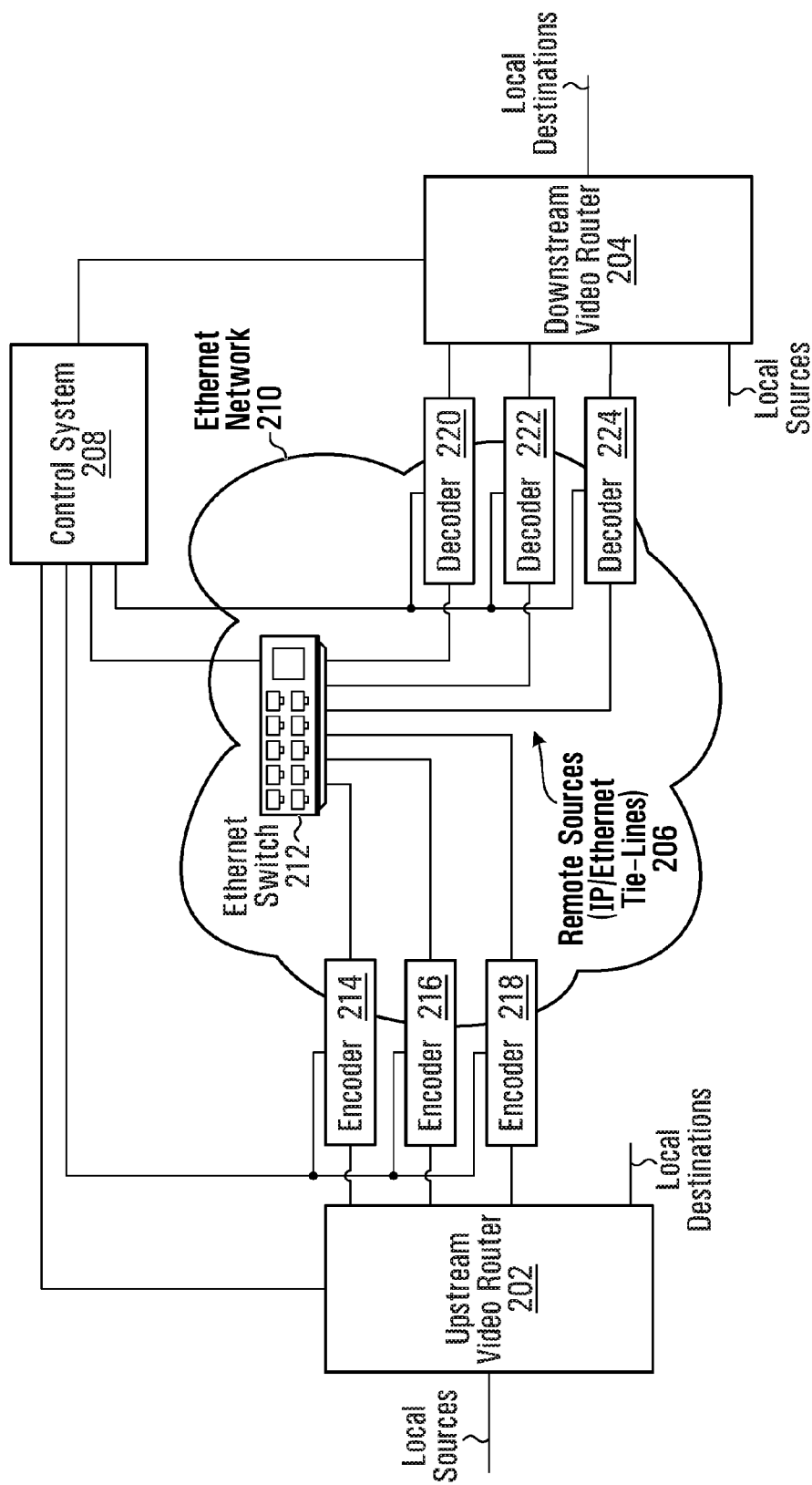
FIG. 2 is a block diagram of another example video routing system with hybrid connections.

FIG. 2 is a block diagram of another example video routing system with hybrid connections. In the example video routing system 200, there are two SDI video routers 202, 204 and a control system 208. The SDI video routers 202, 204 are connected by hybrid connections, which include SDI connections and IP/Ethernet connections in the example shown. There are SDI connections or links between the upstream router 202 and Ethernet ingress components in the form of encoders 214, 216, 218 in this example, and between Ethernet egress components in the form of decoders 220, 222, 224 and the downstream router 204. The hybrid connections also include IP/Ethernet tie-lines 206 through the Ethernet switch 212 in the Ethernet network 210. As in the example system 100 in FIG. 1, each of the SDI video routers 202, 204 in FIG. 2 has local source inputs and local destinations, and tie-lines form part of indirect interconnections between the SDI video routers. The tie-lines 206 in FIG. 2 are IP/Ethernet tie-lines which form part of hybrid connections in the example video routing system 200, and enable upstream source requests, such as requests to monitor remote sources from the upstream router 202 at the downstream router 204. Connection control and video routing are handled in this example by the control system 208.

Although many SDI video routers, encoders, Ethernet switches, and decoders may be provided in a video routing system, only representative examples of each type of component have been shown in FIG. 2 to avoid congestion in the drawing. It should therefore be appreciated that the system of FIG. 2, as well as the contents of the subsequent drawings, are intended solely for illustrative purposes, and that the present disclosure is in no way limited to the particular example embodiments explicitly shown in the drawings and described herein.

Those skilled in the art will be familiar with examples of SDI video routers that could be implemented at 202 and 204, SDI/Ethernet encoders and decoders that could be implemented at 214/216/218 and 220/222/224, and Ethernet switches that could be implemented at 212. With SDI video routers as the video routers 202, 204, connections between the routers and the encoders 214, 216, 218 and decoders 220, 222, 224 are SDI connections, and could be running over physical coaxial cables and connectors. Within the Ethernet network 210 in this example, IP connections run over Ethernet cables and connectors between the Ethernet switch 212 and the encoders 214, 216, 218 and between the Ethernet switch 212 and the decoders 220, 222, 224. A video routing system could include different implementations of components which carry the same label in FIG. 2. For example, the SDI video routers 202, 204 need not be identical, all of the encoders 214, 216, 218 need not necessarily be the same type or model of encoder, there could be multiple different Ethernet switches 212, and/or the decoders 220, 222, 224 could be of the same type/model or different types/models.

The control system 208 could be implemented using such components as a processor, a memory storing software for execution by the processor, one or more interfaces to controlled components, and one or more input/output devices for interaction with an operator. An example of a control system is described below. Connections between the control system 208 and the components that it controls could include, for example, Simple Network Management Protocol (SNMP) connections for monitoring and control connections for control, running over Ethernet cabling and connectors and/or other network connections. Many commercially available SDI video routers and Ethernet switches support SNMP for management of network-connected components.

The hybrid system connectivity in the example video routing system 200 in FIG. 2, across an Ethernet and/or IP environment, may enable video links to be automatically distributed to downstream devices via a combination of both SDI and Ethernet/IP. The overall intelligence of the system is implemented at the control system 208, for control of the SDI video routers 202, 204, the Ethernet switch 212, and the various ingress and egress Ethernet/IP components which in the example shown include the encoders 214, 216, 218 and the decoders 220, 222, 224.

According to an embodiment disclosed herein, multiple systems are configurable and controllable such that upstream sources can be switched to downstream destinations using hybrid connectivity. Compressed or uncompressed video links can thus be transported over Ethernet environments in some embodiments. One possible application is upstream monitoring. The control system 208 may provide intelligence to support such features as automatic inventory of system resources, managing connection or link setup and teardown across disparate system types, and/or optimizing signal quality through intelligent bandwidth utilization based on equitable distribution or preconfigured settings. In addition, the control system 208 could monitor Ethernet utilization across the entire Ethernet network switching fabric (within limits of available interfaces) and adjust settings, provide monitoring, and/or provide alarms.

In an embodiment, when a remote switch request is made by the operator, through a user interface device at the control system 208, the control system automatically steps through a series of operations to determine a route and/or available connectivity, and configures the connection or link appropriately by switching the associated SDI routers 202, 204 and setting up the Ethernet/IP connections or links. As part of the logic for this routing, if the requested source is remote (i.e., it is a source video signal of a remote video router that is not directly cabled to the video router for which the remote source is requested), then the control system 208 determines the available bandwidth across the network based on monitoring and profiling traffic and configures the encoder 214, 216, 218 (or other ingress device) with maximum bandwidth values to optimize video link performance in an embodiment. These values could be determined, for example, by an equitable distribution (all channels equally sharing available bandwidth), preconfigured settings (user selected minimum bandwidth settings), or a combination of both. A preconfigured setting availability allows users to predetermine the quality of certain links given desired priorities (e.g., to guarantee highest quality for certain applications or different settings for High Definition (HD) vs. 3G vs. Ultra HD (UHD), etc). In some embodiments, the control system 208 could be configured to automatically readjust bandwidth allocations and/or coding settings at the encoders 214, 216, 218 and the decoders 220, 222, 224 based on changes in bandwidth utilization.

It is important to note that in some embodiments, the control system 208 may operate without Ethernet sniffing enabled, for example when it is not available from the Ethernet switch 212. When operating in this mode, the overall bandwidth budget could be hard coded so that auto-optimization based on the number of active channels can still be supported, illustratively by dividing the predetermined overall budget versus using data derived from network/switch monitoring.

Figure 3:
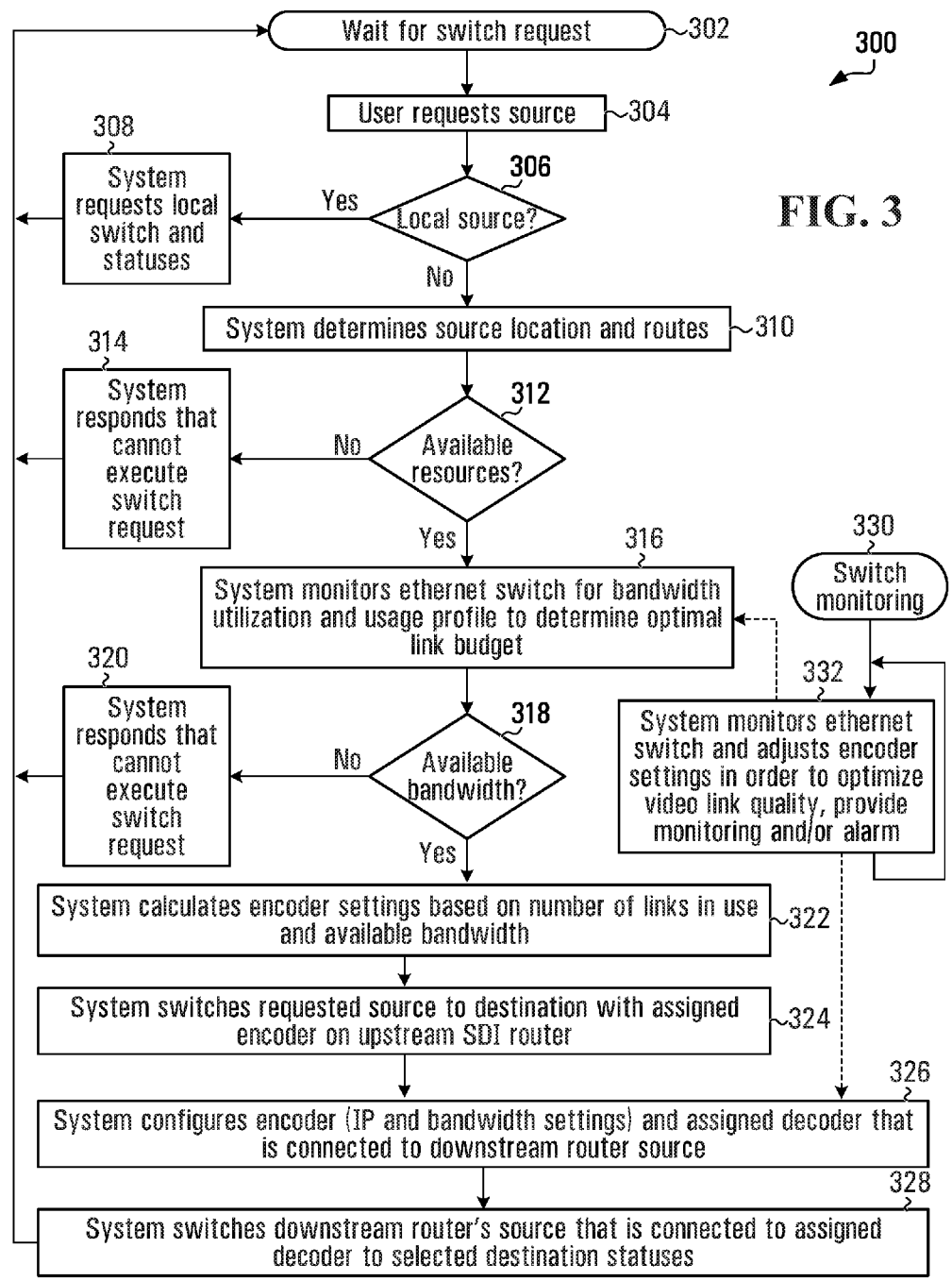
FIG. 3 is a flow diagram of an example method.

FIG. 3 is a flow diagram of an example method. In the example method 300, the control system waits for a switch request at 302. When a switch request is received at 304, in this example a source request from the user, the control system determines at 306 whether the requested source is local. With reference to FIG. 2, suppose the user is requesting the source in respect of the downstream SDI video router 204. If the requested source is local to the downstream SDI video router 204 (YES at 306), then at 308 the control system requests the local switch by the downstream SDI video router 204 to route the requested local video source to the requested local destination. The control system may also request switch status from the downstream SDI video router 204 to confirm success of the requested switch.

For a remote source request (NO at 306), the control system determines the source location and one or more routes to the source location at 310. At 312, a determination is made as to whether resources for the determined route(s) are available. If not (NO at 312), then the control system returns a response to the user at 314 indicating that it cannot execute the switch request. For example, it is possible that routing system components do not provide a tie-line between the remote source and local destination SDI video router(s). In the event of a positive determination at 312, the control system could monitor such parameters as bandwidth utilization and/or usage profile at 316 to determine an optimal link budget. This could involve monitoring parameters at an Ethernet switch through SNMP, for example. This operation is optional, as a hard coded link budget could be used in other embodiments as noted above.

Whether the link budget is dynamically determined at 316 or hard coded, at 318 a determination is made as to whether sufficient bandwidth for the requested switch is available. If not (NO at 318), then the control system returns a response to the user at 320 indicating that it cannot execute the switch request. In some embodiments, a response at 314 and/or 320 could also indicate the reason why the switch request cannot be fulfilled.

In the event of a positive determination at 318, the control system executes SDI and IP/Ethernet routing or switching operations at 322 to 328. In some embodiments, as shown, the control system calculates encoder settings based on a number of links in use and available bandwidth at 322, and switches the requested remote source to the encoder on the upstream SDI video router at 324. The control system may also request switch status from the upstream SDI video router to confirm success of the requested switch. At 326, the control system configures encoder settings at the encoder, including IP and bandwidth settings in the example shown, as well as an assigned decoder that is connected to the downstream SDI video router for which the switch request was made. The encoder and decoder used in routing are determined as part of the route calculation at 310 and/or the link budget determination at 316. The downstream SDI router source that is connected to the assigned decoder is switched to the requested destination at 328. The control system may also request switch status from the downstream SDI video router to confirm success of the requested switch.

The elements of FIG. 3 which are described above provide an overview of control system operation and intelligence in accordance with an embodiment. Elements 330, 332 relate to optional ongoing network/system analysis and data that allow the system to make decisions and intelligent link optimization based on monitoring rather than hard coding or otherwise fixed routing parameters.

Switch monitoring is represented at 330, and could involve the control system monitoring the Ethernet switch(es) in IP/Ethernet segments of hybrid connections between SDI video routers in a system such as shown in FIG. 2. Such monitoring, through SNMP for example, is relevant to 316 in FIG. 3, and to encoder setting determination at 322. In some embodiments, encoder settings and corresponding decoder settings are dynamically adjusted at 326 in accordance with changing system conditions. Dynamic adjustments could be intended to optimize video link quality, provide monitoring, and/or support alarm capabilities.

The example method 300 is illustrative of one embodiment. Other embodiments could include additional, fewer, and/or different operations, performed in an order similar to that shown in FIG. 3 or in a different order. Further variations may be or become apparent.

In general, a method could involve receiving a request for routing a video source signal to a video router from a remote video router, as shown by way of example at 304. Responsive to the request, a control system automatically determines whether the video source signal is routable to the video router from the remote video router over a hybrid connection between the video router and the remote video router. This automatic determination by the control system does not require the operator to use multiple control interfaces or surfaces to make the request or find routes for the hybrid connection, even though the hybrid connection includes connection segments of different types.

In the embodiment shown in FIG. 3, the routability determination involves the local source determination at 306, and for a remote source, determining at 312 whether communication network resources are available to switch a route for the hybrid connection, and determining at 318 whether capacity available on the hybrid connection is sufficient to carry the video source signal. A response to the request is returned at 314 or 320 indicating that the request cannot be executed, if communication network resources are not available to switch a route for the hybrid connection or the capacity available on the hybrid connection is not sufficient to carry the video source signal.

The capacity determination could involve monitoring parameters on one or more of the connection segments and determining a link budget based on the parameters. Bandwidth utilization and usage profile shown at 316 are examples of such parameters. In other embodiments, additional, fewer, and/or different parameters could be monitored. By way of example, monitored connection segment(s) could include an Ethernet connection, and the monitoring could involve monitoring parameters at an Ethernet switch SNMP. As noted above, a hard coded link budget could instead be used, in which case the capacity determination is based on a hard coded link budget for one or more of the connection segments.

The operations at 322 to 328 illustrate an example of routing the video source signal to the video router from the remote video router through the hybrid connection, where it is determined that the video source signal is routable to the video router from the remote video router over a hybrid connection. In the case of SDI video routers and a hybrid connection that includes an Ethernet connection, for example, the Ethernet connection could include an Ethernet connection between an encoder and a decoder through an Ethernet switch. The routing could then involve determining settings for the Ethernet encoder and the Ethernet decoder as shown at 322 and configuring the Ethernet encoder and the Ethernet decoder with the determined settings at 326. The IP and bandwidth settings shown at 326 are illustrative examples of encoder and decoder settings, and these settings and/or other settings could be used in different embodiments. It should be appreciated, however, that SDI and Ethernet/IP hybrid connections are illustrative examples, and other embodiments could be applied to hybrid connections that include other connection types.

In some embodiments, one or more of the connection segments of the hybrid connection are monitored, and the settings of the Ethernet encoder and the Ethernet decoder are dynamically adjusting based on the monitoring. This is represented in FIG. 3 at 330, 332.

As discussed in further detail below with reference to FIGS. 4 to 7, a hybrid connection could be an additional connection that is being set up in addition to one or more other active hybrid connections already in use between the video routers. In this scenario, a method could also involve determining available bandwidth on one or more of the connection segments of the hybrid connection for the current request, and determining a distribution of the available bandwidth between all of the hybrid connections. The distribution determination could involve determining an equal distribution of the available bandwidth between the hybrid connections, or allocating a minimum bandwidth to one of the hybrid connections and determining a distribution of a remainder of the available bandwidth between the other hybrid connection(s). Other distributions are also possible.

In some embodiments, a method also involves presenting a GUI on a display. Example GUI screens are described below with reference to FIGS. 9 and 10.

FIGS. 4 to 7 are block diagrams illustrating operating modes of example video routing systems with hybrid connections. The example video routing systems shown in FIGS. 4 to 7 correspond to the example video routing system 200 in FIG. 2, with several different connection scenarios of upstream sources requested to be sent to downstream destinations.

Figure 4:
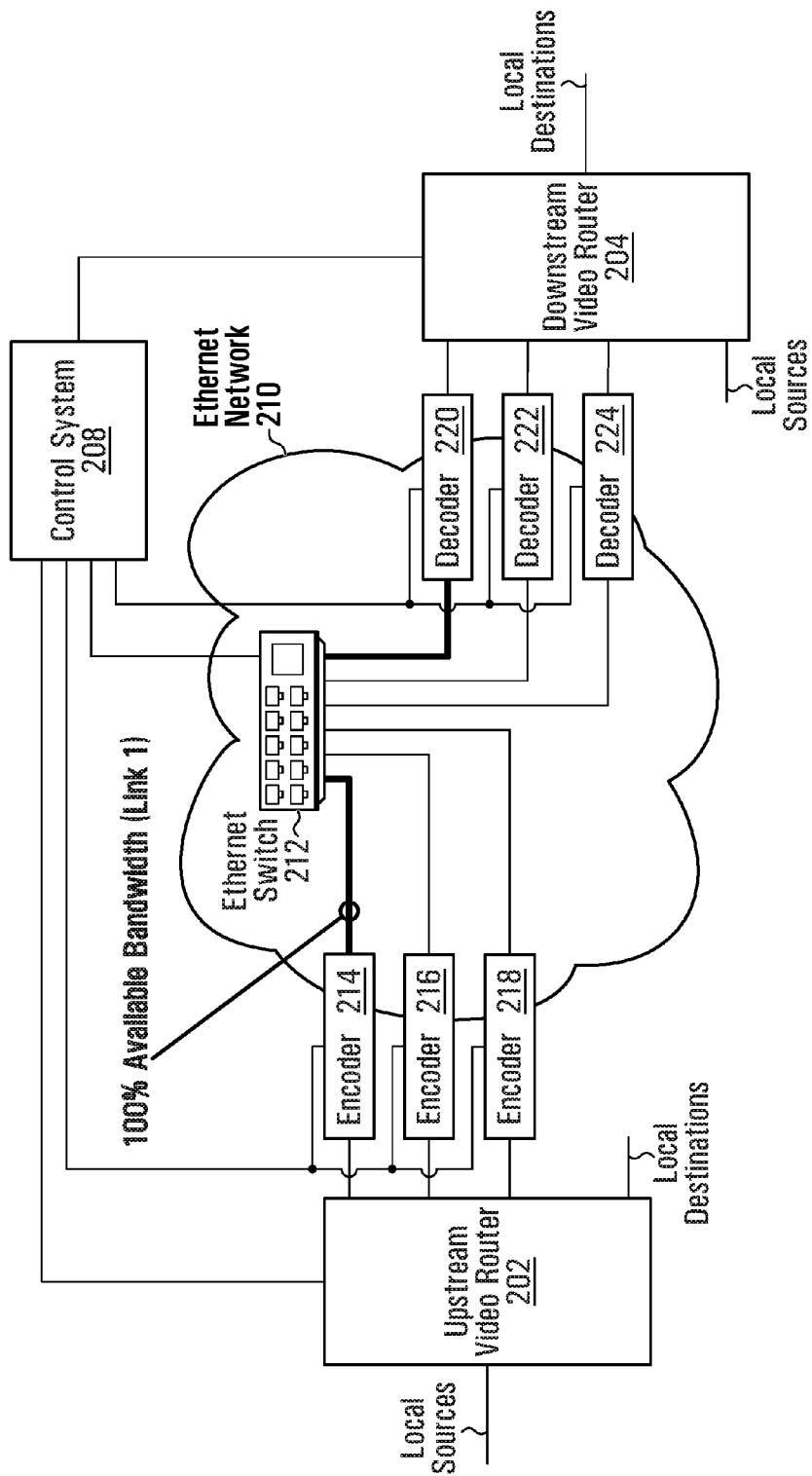
FIGS. 4 to 7 are block diagrams illustrating operating modes of example video routing systems with hybrid connections.

In FIG. 4, a single video source at the upstream SDI video router 202 was requested to be sent to a destination at the downstream SDI video router 204. This is accomplished via a hybrid connection from a destination port or interface at the upstream router 202, through the encoder 214, the Ethernet switch 212, and the decoder 220, to a source port or interface at the downstream router 204. The hybrid connection and local switching at each of the SDI video routers 202, 204 are controlled by the control system 208. There is only one active IP/Ethernet tie-line in the example shown in FIG. 4, and accordingly this IP/Ethernet connection segment of the hybrid connection could be assigned 100% of available bandwidth as shown. It should be noted that the available bandwidth referenced in FIGS. 4 to 7 may be a subset of the overall Ethernet network bandwidth and either hard-configured by the user or operator or determined the by control system 208 based on monitoring and profiling the overall traffic through the Ethernet switch 212.

Figure 5:
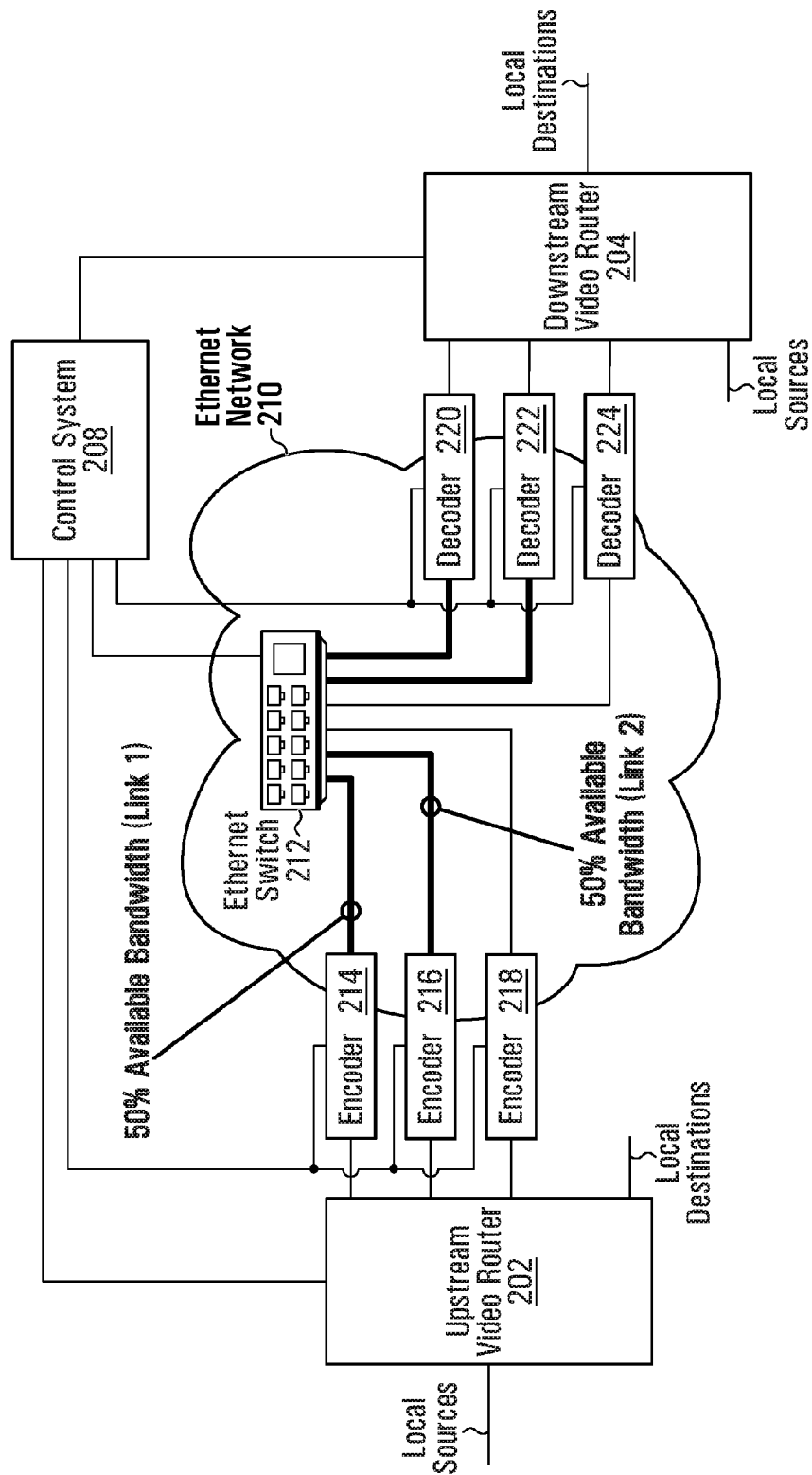

FIG. 5 shows the addition of a second channel for a second hybrid connection including a connection (Link 2) between the encoder 216 and the decoder 222. As shown in FIG. 5, the available bandwidth is split equally between Link 1 and Link 2.

Figure 6:
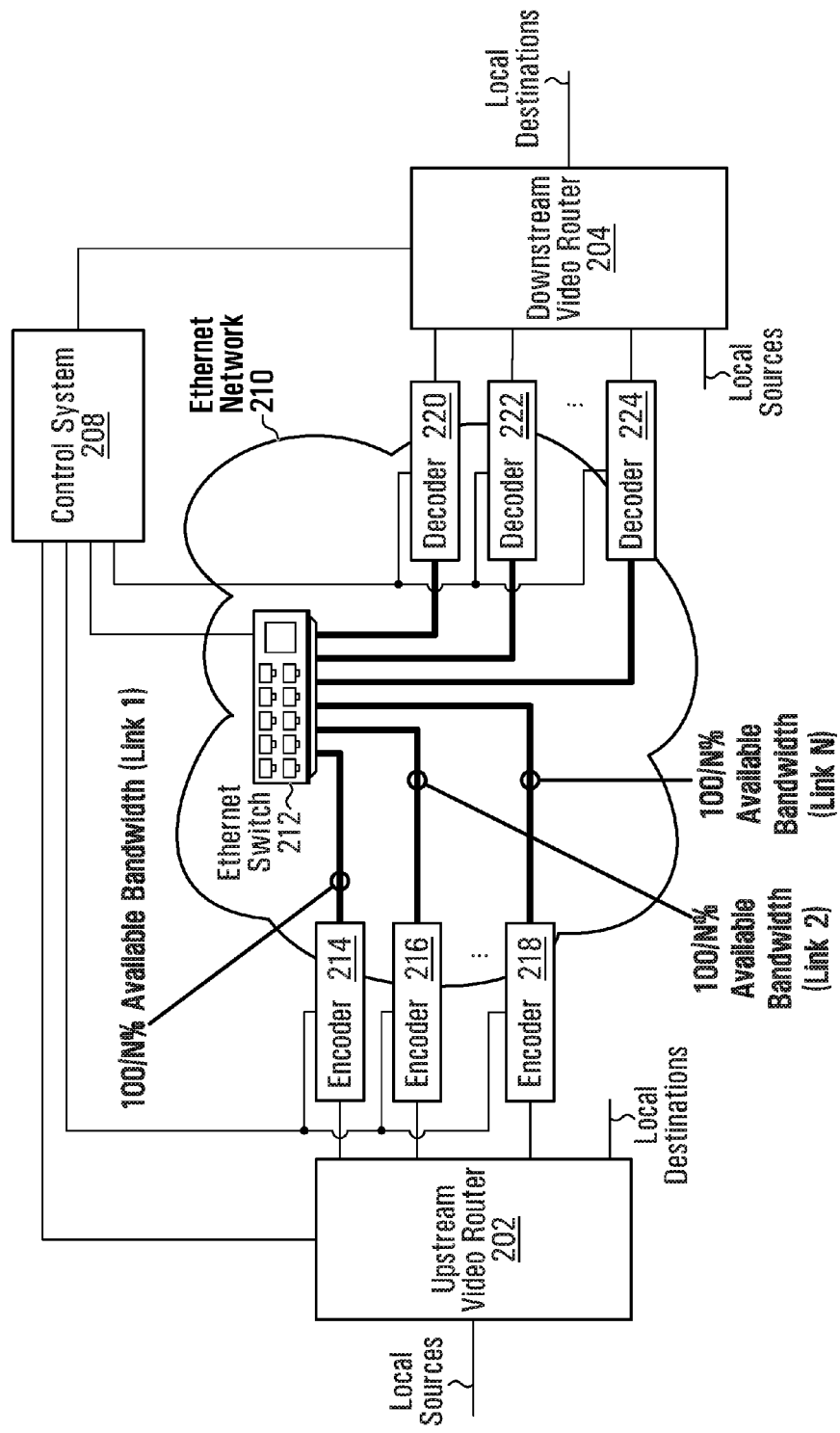

FIG. 6 shows an overall logical representation for a number N of channels or links for N hybrid connections. As noted in FIG. 5, for this equitable distribution example, each link is given and equal share of the available bandwidth, specifically (100/N)% or (1/N)th of the available bandwidth or a percentage of the available bandwidth, calculated as 100% divided by the number of channels. In an embodiment, the bandwidth share or allocation for a connection/link is limited by the amount of compression supported by the encoder for that connection/link, and once that limit is reached, the control system 208 will respond with an indication that the requested switch is not routable. This is an example of a negative available bandwidth determination at 318 in FIG. 3.

Figure 7:
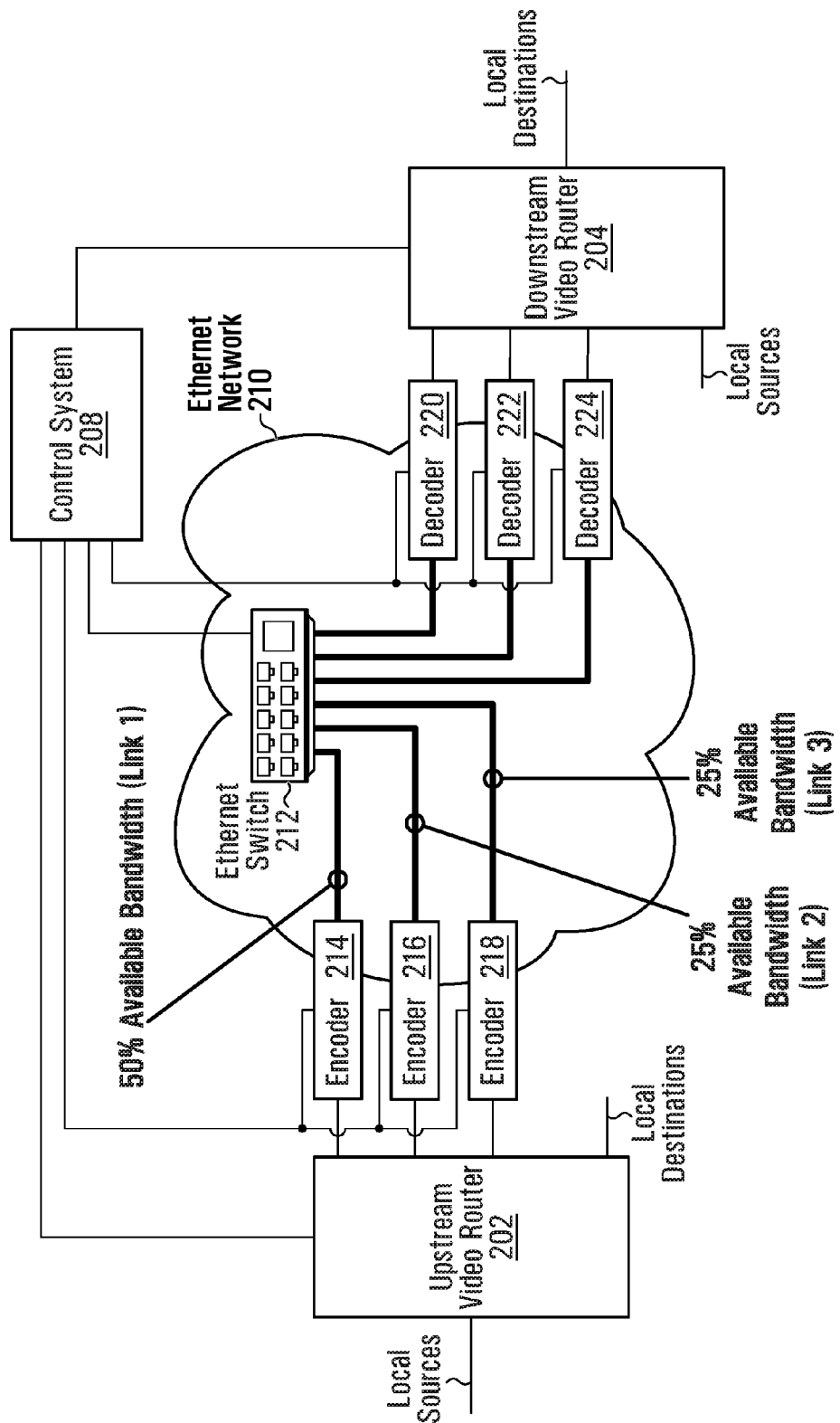

FIG. 7 demonstrates a further example use case where one channel (Link 1) has been set to utilize a minimum 50% of the available bandwidth. If Link 1 were the only channel, then it could go up to utilizing 100% of the available bandwidth as shown in FIG. 4. Such a minimum setting could also or instead be set to a minimum of 'X' Mb/s. The remaining channels (Link 2 and Link 3 in this example) equitably split the remaining availability (i.e., 25% each).

In another example of an equitable mode for allocating available bandwidth, the control system 208 could auto-detect the SDI signals incoming to the encoders 214, 216, 218 from the upstream router and determine an equitable bandwidth allocation on that basis. A 3Gbps incoming SDI signal for Link 1 and two 1.5Gbps signals for Link 2 and Link 3 could be assigned the allocations shown in FIG. 7 instead of compressing the 3Gbps signal and using an equal bandwidth distribution of the type shown in FIG. 6, for example. Thus, there could be different levels or types of equitable bandwidth management.

Figure 8:
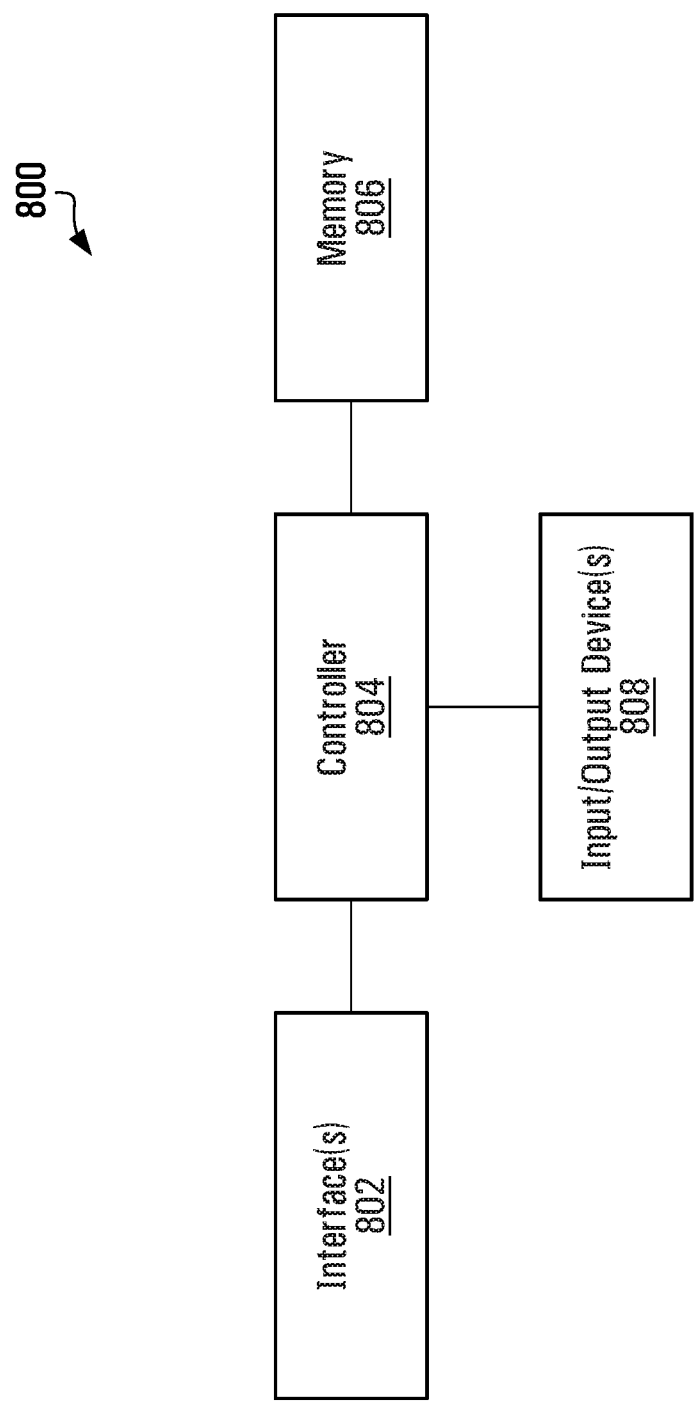
FIG. 8 is a block diagram of an example control system.

FIG. 8 is a block diagram of an example control system 800, which includes one or more interfaces 802, a controller 804, a memory 806, and one or more input/output (I/O) devices 808.

The interface(s) 802 include some sort of physical port or connector and associated circuitry to enable the controller 804 to communicate with components in a video routing system. The specific structure of an interface 802 is implementation-dependent, and may vary with the type(s) of connection(s) and/or protocol(s) to be supported. There could be multiple interfaces at 802 to enable the controller 804 to communicate with different controlled components and monitored components, for example. A single physical interface could potentially support communications with multiple components.

In general, hardware, firmware, components which execute software, or some combination thereof might be used in implementing at least the controller 804.

Electronic devices that might be suitable for implementing the controller 804 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

The memory 806 includes one or more memory devices. The memory device(s) could include a solid-state memory device and/or a memory device with a movable or even removable storage medium. Multiple different types of memory devices could be used to implement the memory 806. In an embodiment, the memory 806 stores software for execution by the controller 804. The memory 806 could also store such information as monitoring results and/or hard-coded bandwidth allocations.

At least a display is provided as an I/O device 808, to allow presentation of a user interface to an operator/user. Such a display could be a Liquid Crystal Display (LCD), a Light Emitting Diode (LED) display, or another type of display device. Other I/O devices could also be implemented at 808 for interaction with a user, to receive inputs from and/or provide outputs to the user. For example, a keyboard and/or a mouse as an I/O device 808 could be used in conjunction with a display to enable user inputs into the control system 800.

In operation, the controller 804, which is operatively coupled to at least a display at 808 and to an interface at 802 that enables the controller to communicate with controlled components, is operable to present on the display a single user interface to enable a user to make a request for routing a video source signal to a video router from a remote video router. In an embodiment, the controller 804 is configurable or operable to perform operations as described herein by executing software that is stored in the memory 806.

The controller 802 is further configured to automatically determine, responsive to the request, whether the video source signal is routable to the video router from the remote video router over a hybrid connection that includes connection segments of different types between the video router and the remote video router, and to route the video source signal to the video router from the remote video router through the hybrid connection where it is determined that the video source signal is routable to the video router from the remote video router over a hybrid connection.

The controller 804 could also be configured to monitor parameters on one or more of the connection segments through one or more interfaces at 802. The same interface(s) at 802 could be used for control and monitoring, or different interfaces could be provided for these operations. In an embodiment that supports monitoring, the controller 804 is configured to determine a link budget for the hybrid connection based on the parameters.

The example control system 800 is intended solely for illustrative purposes. Other embodiments could include additional, fewer, and/or different components, interconnected similarly to or differently from the example in FIG. 8. It should also be appreciated that the controller 804 could perform the operations described above in any of various ways, and/or perform other operations. For instance, examples of how operations could be performed and examples of other operations are described elsewhere herein, including with reference to FIG. 3. The controller 804 could be configured to make determinations in respect of communication network resources and/or available capacity and provide, in the user interface, a response to the request indicating that the request cannot be executed, where communication network resources are not available to switch a route for the hybrid connection or the capacity available on the hybrid connection is not sufficient to carry the video source signal, for example. The controller 804 could also or instead be configured to route the hybrid connection by determining Ethernet encoder and decoder settings and configuring the Ethernet encoder and the Ethernet decoder with the determined settings. Operations in respect of determining available bandwidth and a distribution of the available bandwidth between multiple hybrid connections could be performed by the controller 804 as well.

Figure 9:
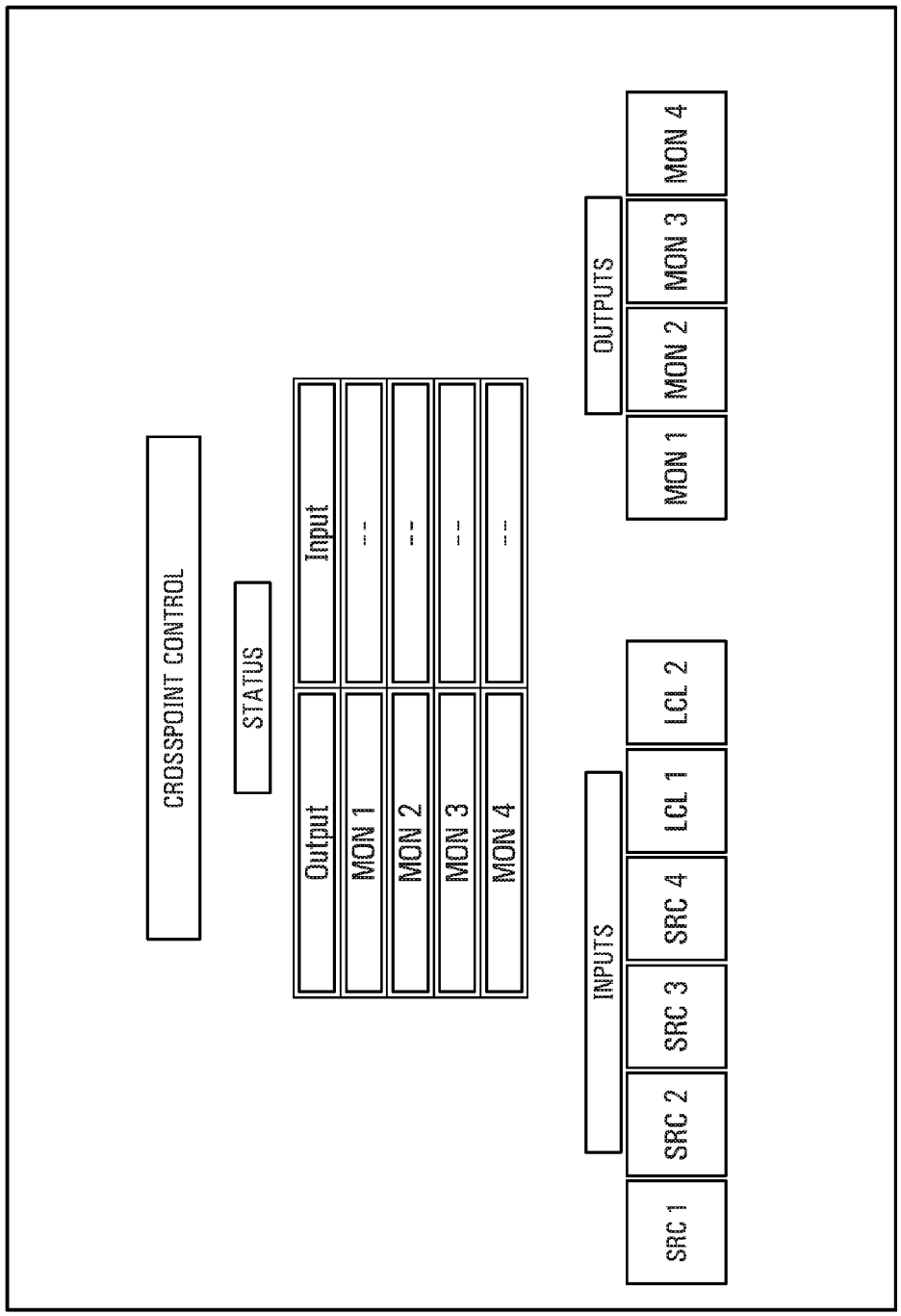
FIGS. 9 and 10 are block diagrams illustrating example Graphical User Interfaces (GUIs).
Figure 10:
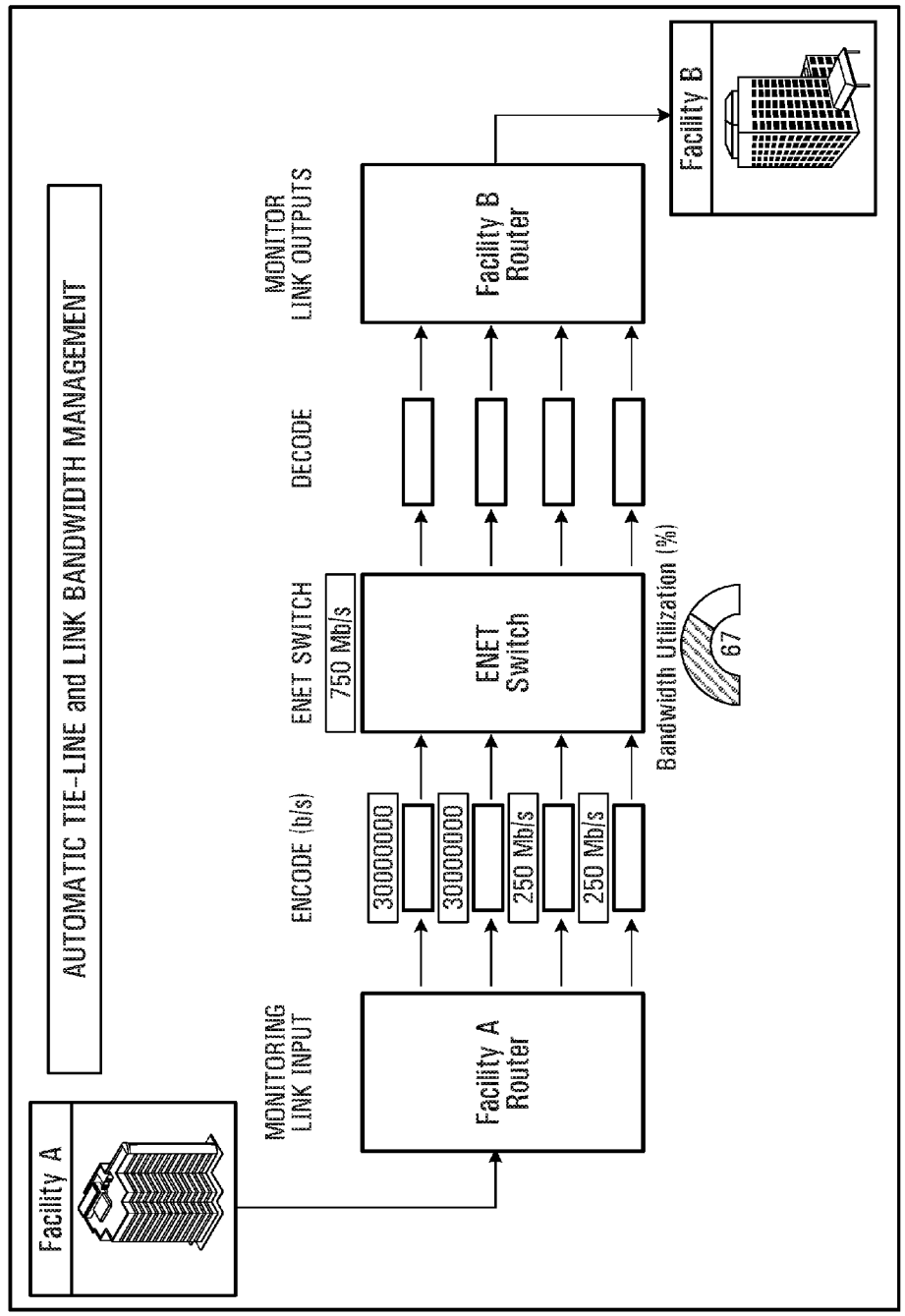

FIGS. 9 and 10 are block diagrams illustrating example Graphical User Interfaces (GUIs). These GUIs could be part of a user interface that is presented to a user by the controller 804 (FIG. 8) on a display. FIG. 9 is an example of a user's/operator's view with a basic route request bus control GUI. FIG. 10 is an example of a more advanced view showing background intelligence and link data.

The example GUI of FIG. 9 includes representations of video outputs of a video router, including "MON 1", "MON 2", "MON 3", and "MON 4". The "MON" labels might be used in embodiments in which video source signals from a remote router are to be monitored. Different labels could be used for video router outputs in other embodiments. More generally, FIG. 9, and also FIG. 10, are illustrative examples, and labels, shapes, and layouts could be different in other embodiments.

FIG. 9 also shows representations of video sources of a remote video router. These representations are labelled "SRC 1", "SRC 2", "SRC 3", "SRC 4", under "INPUTS". The inputs "LCL 1", "LCL 1" are local inputs that are not connected to a tie-line in this example, and could be used to "park" or free up a tie-line by switching a destination (output) that was previously using a tie-line to a local source without having to create a special command to park the tie-line or disconnect the destination.

A control graphical element to enable a user to request routing of one or more of the video sources from the remote video router (the "SRC" inputs) to one or more of the outputs of the video router (the "MON" outputs), over a hybrid connection that includes connection segments of different types between the video router and the remote video router, could be implemented in various ways. In general, such a request could be made by selecting representations of each video source that is to be routed and each output to which each video source is to be routed.

In the example GUI of FIG. 9, each "Input" block in the table below "STATUS" could be a control graphical element that is selectable by a user, using a touchscreen display or a mouse in conjunction with a display, for example. In that case, a user could select the Input block next to the desired MON destination, and then select the representation of the SRC input under INPUTS that is to be routed to that destination. The STATUS table could instead be a listing of current status, and the representations under INPUTS and OUTPUTS could be control graphical elements that are selectable by a user to make a request. In that case, a user could select the representation of the desired MON destination under OUTPUTS, and then select the representation of the SRC input under INPUTS that is to be routed to that destination. The MON/SRC selection order could instead be reversed in other embodiments.

Other request/selection options are also possible. For instance, a drag-and-drop type selection could be supported. A user could then drag and drop the desired SRC representation into the Input block next to the desired MON destination, or onto the representation of the desired MON destination under OUTPUTS. Similarly, a MON representation under OUTPUTS could also or instead be dragged and dropped onto the representation of the desired SRC for that destination.

Any of the representations under INPUTS, OUTPUTS, and STATUS in FIG. 9 could be a control graphical element to enable a user to generate source routing requests.

The LCL inputs are local and would not involve routing through hybrid connections, but local routing of local inputs to local outputs for a video router are also supported in the example GUI of FIG. 9.

A GUI need not be restricted to allowing a user to make source requests. The example GUI of FIG. 9 also includes a STATUS table indicating the input that is being routed to each output. As noted above, when a switch request cannot be executed, a response is returned. This could be implemented as a warning or alert message next to an output or input in the status table, for example, indicating which requested source could not be routed to the requested destination. An unsuccessful request could also or instead be indicated by color or other formatting of an entry in the STATUS table. Suppose, for example, that the user requests routing of SRC 1 to MON 1. An entry of "SRC 1" could be added in grey under Input, next to the MON 1 block in the STATUS table, as an indication that the request is in progress but has not yet been completed. The SRC 1 entry could then be changed to green to indicate that routing was successful, or to red on failure. Different failure colors could be provided for different causes, such as failure for lack of resources or failure for lack of bandwidth. In the event of a request failure, previous source routing (if any) could be maintained, and the STATUS table could be updated to reflect such previous routing instead of the requested new routing.

Other formatting such as font, size, etc. could be used instead of or in addition to color to indicate status. Status indications could also or instead be explicit, in the form of labels such as "Pending", "Active", "Failed", "Failed for Resources", or "Failed for Bandwidth" next to source entries in the Input blocks of the STATUS table. The present disclosure is not in any way limited to specific status indicators.

The STATUS table in FIG. 9 may provide an indication of status of hybrid connectivity between the listed Outputs and Inputs. A GUI could also or instead provide indications of status of source availability. For example, selectability of sources could be limited based on a route access list or a negative acknowledgement after a request fails. The representation for an unavailable source under INPUTS could be "greyed out" or otherwise indicated to be unavailable for selection, for instance.

The GUI of FIG. 9 could be provided as one screen of a more comprehensive GUI that also includes other screens, such as the example shown in FIG. 10. In FIG. 10, there are representations of the video router and the remote video router, as well as the facilities in which the video routers are located. As in FIG. 9, FIG. 10 is an example for monitoring video source signals from one video router at another video router, which is intended as a non-limiting illustrative example.

The example in FIG. 10 also includes representations of hybrid connections between the video router and the remote video router, including encode, decode, and Ethernet switch representations. On the encode side of the Ethernet switch representation, bits per second settings are shown, and these are an example of representations of configuration settings that could be shown for each of the hybrid connections. Representations of decode settings could also or instead be shown on the decode side of the Ethernet switch representation.

Above the Ethernet switch in FIG. 10, there is also a representation of total available bandwidth for hybrid connections between the video router and the remote video router, and below the Ethernet switch is a representation of bandwidth utilization of the total available bandwidth by the hybrid connections between the video router and the remote video router.

In the example shown in FIG. 10, there are blank blocks between the routers and the Ethernet switch. In other embodiments, these blocks (or other elements) could include a label, image, or other indicator of the source video signals that are being routed. These blocks (or other elements) could also or instead provide status information for the hybrid connections.

FIG. 9 provides a control interface for routing video source signals over hybrid connections while shielding the user from underlying complexities of setting up hybrid connectivity. A user that is interested in seeing details of hybrid connectivity could transition to a screen such as the example shown in FIG. 10.

What has been described is merely illustrative of the application of principles of embodiments of the present disclosure. Other arrangements and methods can be implemented by those skilled in the art.

For example, references herein to optimization and similar language should not be taken as inferring or requiring that characteristics are truly optimized for all operating conditions. Settings or configurations that are effective or efficient for one set of operating conditions or are intended to impact certain parameters might not necessarily be optimal for other operating conditions or other parameters.

The embodiments shown in the drawings and described above are intended for illustrative purposes. The present disclosure is in no way limited to the particular example embodiments explicitly shown in the drawings and described herein. Other embodiments may include additional, fewer, and/or different device or apparatus components, for example, which are interconnected or coupled together as shown in the drawings or in a different order.

Similar comments also apply in respect of the example methods shown in the drawings and described above. There could be additional, fewer, and/or different operations performed in a similar or different order. For example, not all of the illustrated operations might necessarily be performed in every embodiment.

In addition, although described primarily in the context of methods and systems, other implementations are also contemplated, as instructions stored on a non-transitory computer-readable medium for execution by a processor, for example. Such instructions, when executed by a processor, cause the processor to perform a method as disclosed herein. The electronic devices described above are examples of a processor that could be used to execute such instructions.

We claim:

1. A method comprising:
   receiving a request for routing a video source signal to a video router from a remote video router;
   responsive to the request, automatically determining whether the video source signal is routable to the video router from the remote video router over a hybrid connection between the video router and the remote video router, the hybrid connection comprising connection segments of different types;
   routing the video source signal to the video router from the remote video router through the hybrid connection where it is determined that the video source signal is routable to the video router from the remote video router over a hybrid connection.

2. The method of claim 1, wherein the determining comprises determining whether capacity available on the hybrid connection is sufficient to carry the video source signal by monitoring parameters on one or more of the connection segments and determining a link budget based on the parameters.

3. The method of claim 2, wherein the one or more of the connection segments comprises an Ethernet connection, and wherein the monitoring comprises monitoring parameters at an Ethernet switch through Simple Network Management Protocol (SNMP).

4. The method of claim 1, wherein the determining comprises:
   determining whether capacity available on the hybrid connection is sufficient to carry the video source signal based on a hard coded link budget for one or more of the connection segments.

5. The method of claim 1,
   wherein the determining comprises determining whether communication network resources are available to switch a route for the hybrid connection,
   the method further comprising:
   returning a response to the request indicating that the request cannot be executed, where communication network resources are not available to switch a route for the hybrid connection.

6. The method of claim 1,
   wherein the determining comprises determining whether capacity available on the hybrid connection is sufficient to carry the video source signal,
   the method further comprising:
   returning a response to the request indicating that the request cannot be executed, where the capacity available on the hybrid connection is not sufficient to carry the video source signal.

7. The method of claim 1, wherein the video router and the remote video router comprise respective Serial Digital Interface (SDI) video routers and wherein the hybrid connection comprises an Ethernet connection.

8. The method of claim 7, wherein the Ethernet connection comprises an Ethernet connection between an encoder and a decoder through an Ethernet switch, wherein the routing comprises determining settings for the Ethernet encoder and the Ethernet decoder and configuring the Ethernet encoder and the Ethernet decoder with the determined settings.

9. The method of claim 8, further comprising:
   monitoring one or more of the connection segments;
   dynamically adjusting the settings of the Ethernet encoder and the Ethernet decoder based on the monitoring.

10. The method of claim 1, wherein the hybrid connection comprises one of a plurality of hybrid connections between the video router and the remote video router, the method further comprising:
    determining available bandwidth on one or more of the connection segments;
    determining a distribution of the available bandwidth between the plurality of hybrid connections.

11. The method of claim 10, wherein determining a distribution of the available bandwidth comprises determining an equal distribution of the available bandwidth between the plurality of hybrid connections.

12. The method of claim 10, wherein determining a distribution of the available bandwidth comprises allocating a minimum bandwidth to one of the plurality of hybrid connections and determining a distribution of a remainder of the available bandwidth between other hybrid connections of the plurality of hybrid connections.

13. The method of claim 1, further comprising presenting a Graphical User Interface (GUI) on a display, the GUI comprising:
    representations of video outputs of the video router;
    representations of video sources of the remote video router, the video sources comprising the video source signal;
    a control graphical element to enable a user to generate the request for routing the video source signal to the video router from the remote video router, by selecting the representation of the video source signal and the representation of one of the video outputs of the video router.

14. The method of claim 13, wherein the representations of the video outputs, the representations of the video sources, and the control graphical element comprise a first screen of the GUI, wherein the method further comprises presenting a second screen of the GUI on the display, the second screen comprising:
    representations of the video router and the remote video router;
    representations of hybrid connections between the video router and the remote video router;
    one or more of:
        representations of configuration settings for each of the hybrid connections;
        a representation of total available bandwidth for hybrid connections between the video router and the remote video router;
        a representation of bandwidth utilization of the total available bandwidth by the hybrid connections between the video router and the remote video router.

15. A non-transitory computer-readable medium storing instructions which, when executed by a processor, cause the processor to perform the method of claim 1.

16. An apparatus comprising:
a display;
an interface to enable communication with video routers;
a controller, operatively coupled to the display and to the interface, to present on the display a single user interface to enable a user to make a request for routing a video source signal to a video router from a remote video router; to automatically determine responsive to the request whether the video source signal is routable to the video router from the remote video router over a hybrid connection comprising connection segments of different types between the video router and the remote video router, and to route the video source signal to the video router from the remote video router through the hybrid connection where it is determined that the video source signal is routable to the video router from the remote video router over a hybrid connection.

17. The apparatus of claim 16, further comprising:
an interface, operatively coupled to the controller, to enable the controller to monitor parameters on one or more of the connection segments,
wherein the controller is configured to determine a link budget for the hybrid connection based on the parameters.

18. The apparatus of claim 16,
wherein the controller is configured to determine whether the video source signal is routable to the video router from the remote video router over a hybrid connection by determining whether communication network resources are available to switch a route for the hybrid connection and if so, whether capacity available on the hybrid connection is sufficient to carry the video source signal,
wherein the controller is further configured to provide, in the user interface, a response to the request indicating that the request cannot be executed, where communication network resources are not available to switch a route for the hybrid connection or the capacity available on the hybrid connection is not sufficient to carry the video source signal.

19. The apparatus of claim 16, wherein the video router and the remote video router comprise respective Serial Digital Interface (SDI) video routers and wherein the hybrid connection comprises an Ethernet connection.

20. The apparatus of claim 19, wherein the Ethernet connection comprises an Ethernet connection between an encoder and a decoder through an Ethernet switch, wherein the controller is configured to route the video source signal to the video router from the remote video router through the hybrid connection by determining settings for the Ethernet encoder and the Ethernet decoder and configuring the Ethernet encoder and the Ethernet decoder with the determined settings.

21. The apparatus of claim 16,
wherein the hybrid connection comprises one of a plurality of hybrid connections between the video router and the remote video router,
wherein the controller is further configured to determine available bandwidth on one or more of the connection segments, and to determine a distribution of the available bandwidth between the plurality of hybrid connections.

22. The apparatus of claim 20, wherein the distribution comprises either: an equal distribution of the available bandwidth between the plurality of hybrid connections; or a minimum bandwidth allocation to one of the plurality of hybrid connections and a distribution of a remainder of the available bandwidth between other hybrid connections of the plurality of hybrid connections.

23. The apparatus of claim 16, wherein the single user interface comprises a Graphical User Interface (GUI), the GUI comprising:
    representations of video outputs of the video router;
    representations of video sources of the remote video router, the video sources comprising the video source signal;
    a control graphical element to enable the user to make the request for routing the video source signal to the video router from the remote video router by selecting the representation of the video source signal and the representation of one of the video outputs of the video router.

24. The apparatus of claim 23,
wherein the representations of the video outputs, the representations of the video sources, and the control graphical element comprise a first screen of the GUI, the GUI further comprising a second screen, the second screen comprising:
    representations of the video router and the remote video router;
    representations of hybrid connections between the video router and the remote video router;
    one or more of:
        representations of configuration settings for each of the hybrid connections;
        a representation of total available bandwidth for hybrid connections between the video router and the remote video router;
        a representation of bandwidth utilization of the total available bandwidth by the hybrid connections between the video router and the remote video router.

\* \* \* \* \*